United States Patent
Wang et al.

(10) Patent No.: US 11,210,994 B2
(45) Date of Patent: Dec. 28, 2021

(54) DRIVING METHOD OF DISPLAY PANEL, DISPLAY APPARATUS AND VIRTUAL REALITY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yanfeng Wang, Beijing (CN); Xiaoling Xu, Beijing (CN); Yuanxin Du, Beijing (CN); Yun Qiu, Beijing (CN); Xiao Sun, Beijing (CN)

(73) Assignees: BOE TECHNOLOGY GROUP CO., LTD., Beijing (CN); BEIJING BOE DISPLAY TECHNOLOGY CO.. LTD., Beijing (CN)

( * ) Notice: Subject to any disclaimer, the term of this patent is extended or adjusted under 35 U.S.C. 154(b) by 726 days.

(21) Appl. No.: 16/074,222

(22) PCT Filed: Dec. 15, 2017

(86) PCT No.: PCT/CN2017/116539
§ 371 (c)(1),
(2) Date: Jul. 31, 2018

(87) PCT Pub. No.: WO2018/176922
PCT Pub. Date: Oct. 4, 2018

(65) Prior Publication Data
US 2021/0209998 A1     Jul. 8, 2021

(30) Foreign Application Priority Data
Apr. 1, 2017 (CN) .......................... 201710213103.X

(51) Int. Cl.
*G09G 3/32* (2016.01)
*G06F 3/01* (2006.01)

(52) U.S. Cl.
CPC ............... *G09G 3/32* (2013.01); *G06F 3/011* (2013.01); *G09G 2330/10* (2013.01); *G09G 2340/0407* (2013.01); *G09G 2340/0457* (2013.01)

(58) Field of Classification Search
CPC ........ G09G 2340/0407–0428; G09G 2330/10; G09G 2320/0285
See application file for complete search history.

(56) References Cited

U.S. PATENT DOCUMENTS

| 2008/0240509 A1* | 10/2008 | Hotta .................... H04N 9/3188 382/107 |
| 2009/0016638 A1* | 1/2009 | Nagatsuma .............. H04N 9/07 382/275 |

(Continued)

FOREIGN PATENT DOCUMENTS

| CN | 102645779 A | 8/2012 |
| CN | 106412563 A | 2/2017 |

(Continued)

OTHER PUBLICATIONS

First Office Action dated Apr. 12, 2019, in corresponding Chinese application No. 201710213103.X, with English translation.

(Continued)

*Primary Examiner* — Sanjiv D. Patel
(74) *Attorney, Agent, or Firm* — Nath, Goldberg & Meyer; Joshua B. Goldberg

(57) ABSTRACT

The present application discloses a driving method of a display panel, a display apparatus and a virtual reality device. The display panel includes a middle display region and a peripheral display region at the periphery of the middle display region. The display panel is driven such that a display resolution of the middle display region is greater than a display resolution of the peripheral display region.

19 Claims, 5 Drawing Sheets

(56) References Cited

U.S. PATENT DOCUMENTS

| | | | | |
|---|---|---|---|---|
| 2012/0092397 | A1* | 4/2012 | DeLuca | G09G 5/14 |
| | | | | 345/698 |
| 2012/0162161 | A1* | 6/2012 | Ino | G09G 3/3688 |
| | | | | 345/204 |
| 2014/0062854 | A1 | 3/2014 | Cho | |
| 2016/0267716 | A1* | 9/2016 | Patel | G09G 5/373 |
| 2016/0328884 | A1* | 11/2016 | Schowengerdt | G02B 27/017 |
| 2018/0040274 | A1* | 2/2018 | Kurokawa | G09G 3/3275 |
| 2018/0137602 | A1* | 5/2018 | Spitzer | G06T 3/4007 |

FOREIGN PATENT DOCUMENTS

| | | |
|---|---|---|
| CN | 106531073 A | 3/2017 |
| CN | 106920502 A | 7/2017 |
| CN | 106935224 A | 7/2017 |
| CN | 107333119 A | 11/2017 |

OTHER PUBLICATIONS

International Search Report dated Mar. 16, 2018 corresponding to application No. PCT/CN2017/116539.

* cited by examiner 101 102

101 1021 1022 1023

DRIVING METHOD OF DISPLAY PANEL, DISPLAY APPARATUS AND VIRTUAL REALITY DEVICE

CROSS-REFERENCE TO RELATED APPLICATION

This is a National Phase Application filed under 35 U.S.C. 371 as a national stage of PCT/CN2017/116539, filed on Dec. 15, 2017, an application claiming the benefit of priority to Chinese Patent Application No. 201710213103.X filed on Apr. 1, 2017, the contents of which are incorporated herein in their entirety by reference.

TECHNICAL FIELD

The present disclosure relates to the field of display technology, and particularly relates to a driving method of a display panel, a display apparatus and a virtual reality device.

BACKGROUND

Virtual Reality (VR) technology and Augmented Reality (AR) can combine the virtual world with the real world to provide users with a better human-computer interaction experience. In AR devices and VR devices, the experience quality of a display screen is an important factor affecting the overall user experience. Thus, improving the quality of user experience on the display screen has become a hot research direction in the field.

SUMMARY

The present disclosure provides a driving method of a display panel, a display apparatus and a virtual reality device.

In one aspect, the present disclosure provides a driving method of a display panel, the display panel including a middle display region and a peripheral display region surrounding the middle display region; wherein the driving method includes: driving the display panel such that a display resolution of the middle display region is greater than a display resolution of the peripheral display region.

Optionally, the display resolution of the peripheral display region decreases as moving away from the middle display region.

Optionally, the peripheral display region includes a plurality of peripheral display sub-regions, and of any two adjacent peripheral display sub-regions of the plurality of peripheral display sub-regions, one peripheral display sub-region away from the middle display region surrounds the other peripheral display sub-region close to the middle display region, and the display resolution of any peripheral display sub-region is greater than the display resolution of other peripheral display sub-region on a side of the peripheral display sub-region away from the middle display region.

Optionally, the peripheral display region is ring-shaped.

Optionally, each of the plurality of peripheral display sub-regions is ring-shaped.

Optionally, the peripheral display region includes a plurality of peripheral display sub-regions on two sides of the middle display region, each of the plurality of peripheral display sub-regions is bar-shaped, and the display resolutions of the plurality of peripheral display sub-regions decrease in a direction away from the middle display region.

Optionally, the peripheral display region includes a first peripheral display sub-region and a second peripheral display sub-region from a side close to the middle display region to a side away from the middle display region;

the display panel corresponds to a viewing reference point, which is a point located on a normal line passing through a center point of the display panel and having a distance equal to a preset viewing distance from the center point;

a horizontal plane passing through the viewing reference point and passing through midpoints of left and right edges of the display panel in a plan view of the display panel is a horizontal reference plane, a vertical plane passing through the viewing reference point and passing through midpoints of upper and lower edges of the display panel in the plan view of the display panel is a vertical reference plane; a straight line, on the horizontal reference plane, passing through the viewing reference point and perpendicular to a normal line passing through a center point of the display panel is a horizontal rotation axis, a straight line, on the vertical reference plane, passing through the viewing reference point and perpendicular to the normal line passing through the center point of the display panel is a vertical rotation axis;

an area, on the display panel, swept by rotating the horizontal reference plane clockwise by a first angle with the horizontal rotation axis as a rotation axis is a first area; an area, on the display panel, swept by rotating the vertical reference plane clockwise by a second angle with the vertical rotation axis as a rotation axis and rotating the vertical reference plane anticlockwise by the second angle with the vertical rotation axis as a rotation axis is a second area; the middle display region is an overlap area between the first area and the second area;

an area, on the display panel, swept by rotating the horizontal reference plane clockwise by a third angle with the horizontal rotation axis as a rotation axis and rotating the horizontal reference plane anticlockwise by a fourth angle with the horizontal rotation axis as a rotation axis is a third area; the third angle is greater than the first angle; an area, on the display panel, swept by rotating the vertical reference plane clockwise by a fifth angle with the vertical rotation axis as a rotation axis and rotating the vertical reference plane anticlockwise by the fifth angle with the vertical rotation axis as a rotation axis is a fourth area; the fifth angle is greater than the second angle;

the first peripheral display sub-region is an area outside the middle display region and in an overlap area between the third area and the fourth area; and an area, on the display panel, swept by rotating the horizontal reference plane clockwise by a sixth angle with the horizontal rotation axis as a rotation axis and rotating the horizontal reference plane anticlockwise by a seventh angle with the horizontal rotation axis as a rotation axis is a fifth area; the sixth angle is greater than the third angle, and the seventh angle is greater than the fourth angle; an area, on the display panel, swept by rotating the vertical reference plane clockwise by an eighth angle with the vertical rotation axis as a rotation axis and rotating the vertical reference plane anticlockwise by the eighth angle with the vertical rotation axis as a rotation axis is a sixth area; the eighth angle is greater than the fifth angle; the second peripheral display sub-region is an area outside the middle display region and the first peripheral display sub-region and in an overlap area between the fifth area and the sixth area.

Optionally, the peripheral display region further includes a third peripheral display sub-region on a side of the second peripheral display sub-region away from the middle display region, an area, on the display panel, swept by rotating the horizontal reference plane clockwise by a ninth angle with the horizontal rotation axis as a rotation axis and rotating the horizontal reference plane anticlockwise by a tenth angle with the horizontal rotation axis as a rotation axis is a seventh area; the ninth angle is greater than the sixth angle, and the tenth angle is greater than the seventh angle; an area, on the display panel, swept by rotating the vertical reference plane clockwise by an eleventh angle with the vertical rotation axis as a rotation axis and rotating the vertical reference plane anticlockwise by the eleventh angle with the vertical rotation axis as a rotation axis is an eighth area; the eleventh angle is greater than the eighth angle; and the third peripheral display sub-region is an area outside the middle display region, the first peripheral display sub-region and the second peripheral display sub-region and in an overlap area between the seventh area and the eighth area.

Optionally, the first angle is 30°; the second angle is 15°; the third angle is 35°; the fourth angle is 25°; the fifth angle is 35°;

the sixth angle is 60°; the seventh angle is 55°; the eighth angle is 90°; and the ninth angle is 75°; the tenth angle is 75°; the eleventh angle is 95°.

Optionally, a ratio between the display resolution of the first peripheral display sub-region and the display resolution of the middle display region ranges from $Cos^2(35°)$ to 1; and a ratio between the display resolution of the second peripheral display sub-region and the display resolution of the middle display region ranges from 0 to $Cos^2(35°)$.

Optionally, a light emitting element constituting a pixel on the display panel is a micro-LED.

Optionally, the middle display region and the peripheral display region of the display panel have micro-LEDs with different pixel densities.

Optionally, an actual resolution of each peripheral display sub-region is equal to an actual resolution of the middle display region.

Optionally, the actual resolutions of each peripheral display sub-region and the middle display region are in the range of 2000 ppi to 2100 ppi.

Optionally, a length ratio of a long edge and a short edge of the display panel in a plan view thereof is 8:3.

Optionally, the middle display region of the display panel has an actual resolution greater than or equal to the display resolution of the middle display region, and the peripheral display region of the display panel has an actual resolution greater than or equal to the display resolution of the peripheral display region.

In another aspect, the present disclosure further provides a display apparatus, including a display panel and a driver, the display panel including a middle display region and a peripheral display region surrounding the middle display region;

wherein the driver drives the display panel such that a display resolution of the middle display region is greater than a display resolution of the peripheral display region.

Optionally, the display apparatus further includes:
an input device configured to receive a user input; and
a first processor functioning as:
a region selection unit configured to determine a to-be-adjusted region on the display panel according to the user input; and a resolution adjustment unit configured to adjust a display resolution of the to-be-adjusted region.

Optionally, the display apparatus further includes:
a memory configured to store position information of the to-be-adjusted region and display resolution information of the to-be-adjusted region that has been adjusted.

Optionally, the display apparatus further includes a second processor functioning as:

a pixel selection unit configured to select an abnormal pixel on the display panel; and an alternative pixel determination unit configured to determine an alternative pixel that is around the abnormal pixel and does not perform image display, and drive the determined alternative pixel to perform image display.

In another aspect, the present disclosure further provides a virtual reality device, including the above-described display apparatus.

DETAILED DESCRIPTION

To make those skilled in the art better understand technical solutions of the present disclosure, a display panel, a display apparatus and a virtual reality (VR) device provided in the present disclosure will be described in detail below in conjunction with the accompanying drawings.

The display panel in the present disclosure is particularly suitable for a display panel in a VR device or an AR device. In the present disclosure, "an actual resolution of a display panel" refers to a physical resolution of the display panel, and "a display resolution of a display panel" refers to a resolution adopted by the display panel during image display. The display resolution of a display panel is smaller than or equal to the actual resolution of the display panel.

Figure 1:
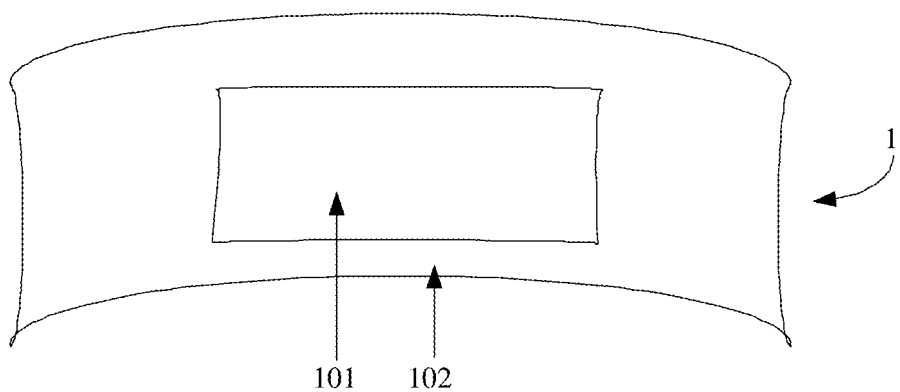
FIG. 1 is a schematic diagram of a structure of a display panel provided in an embodiment of the present disclosure.

FIG. 1 is a schematic diagram of a structure of a display panel provided in an embodiment of the present disclosure. As shown in FIG. 1, a display panel 1 includes a middle display region 101 and a peripheral display region 102 surrounding the middle display region 101. When the display panel 1 displays an image, the display panel 1 is driven such that the display resolution of the middle display region 101 is greater than the display resolution of the peripheral display region 102.

When a user uses a VR/AR device, the user is most focused on the middle display region 101 of the display panel 1, and the user's attention on the peripheral display region 102 is relatively dispersed. Considering this phenomenon, the technical solutions of the present disclosure break the conventional setting that the display panel in the prior art has a uniform display resolution throughout, divide a display region of the display panel 1 and make the display resolution of the middle display region 101 greater than the display resolution of the peripheral display region 102 surrounding the middle display region 101, so as to adapt to the viewing habit of the human eye. Thus, the quality of user experience can be improved effectively, and the display effect is guaranteed while ensuring low power consumption.

It should be noted that the display panel 1 in the embodiments of the present disclosure may be a flat display panel, or may be a curved display panel. Optionally, the display panel 1 is a curved display panel. The display panel may be made of a flexible material. For example, a flexible material such as PET (polyethylene terephthalate) may be used. Optionally, as a curved radian of the curved display panel, a radian of the maximum visual field of the human eye may be adopted, thereby ensuring perfect immediacy.

Optionally, the display resolution of the peripheral display region of the display panel decreases as moving away from the middle display region.

Figure 2:
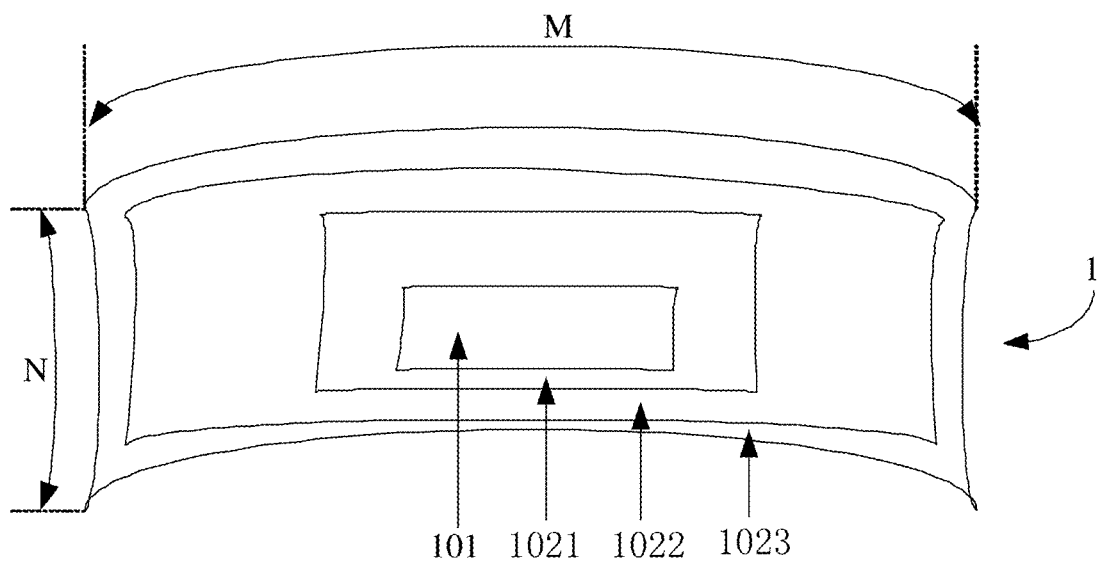
FIG. 2 is a schematic diagram of a structure of a display panel provided in an embodiment of the present disclosure.

FIG. 2 is a schematic diagram of a structure of a display panel provided in an embodiment of the present disclosure. As shown in FIG. 2, in the embodiment, the peripheral display region 102 surrounding the middle display region 101 includes a plurality of peripheral display sub-regions 1021, 1022 and 1023, and the display resolution of the middle display region 101 is greater than the display resolution of each of the peripheral display sub-regions 1021, 1022 and 1023.

Optionally, of any two adjacent peripheral display sub-regions of the plurality of peripheral display sub-regions, one peripheral display sub-region which is farther away from the middle display region surrounds the other peripheral display sub-region which is closer to the middle display region. Optionally, the display resolution of any one of the peripheral display sub-regions 1021, 1022 and 1023 is greater than the display resolution of other peripheral display sub-region on a side of the one peripheral display sub-region away from the middle display region 101.

Considering that a user's attention will gradually decrease in a direction from a center point of the display panel 1 to an edge of the display panel 1, in the present disclosure, the display resolutions of the peripheral display sub-regions 1021, 1022 and 1023 decrease as moving away from the middle display region 101, thus better matching the viewing habit of the human eye and further improving the quality of user experience.

As an alternative, each of the peripheral display sub-regions 1021, 1022 and 1023 is ring-shaped. As shown in FIG. 2, there are three peripheral display sub-regions, which include from a side close to the middle display region 101 to a side away from the middle display region 101: a first peripheral display sub-region 1021, a second peripheral display sub-region 1022 and a third peripheral display sub-region 1023.

In the embodiment, the display panel 1 corresponds to a viewing reference point, the viewing reference point being a point that is located on a normal line passing through the center point of the display panel 1 and whose distance from the center point is equal to a preset viewing distance (a distance between the human eye and the display panel 1, generally 5 cm); a horizontal plane passing through the viewing reference point and passing through midpoints of left and right edges of the display panel in a plan view (referring to FIGS. 1 and 2) of the display panel is a horizontal reference plane, and a vertical plane passing through the viewing reference point and passing through midpoints of upper and lower edges of the display panel in the plan view (referring to FIGS. 1 and 2) of the display panel is a vertical reference plane. A straight line, on the horizontal reference plane, passing through the viewing reference point and perpendicular to a normal line passing through a center point of the display panel is defined as a horizontal rotation axis, and a straight line, on the vertical reference plane, passing through the viewing reference point and perpendicular to the normal line passing through the center point of the display panel is a vertical rotation axis.

Figure 3:
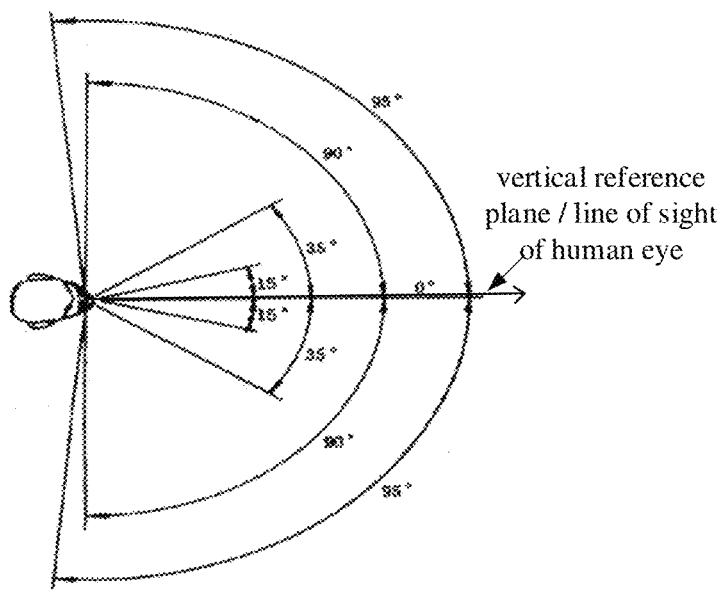
FIG. 3 is a schematic diagram of a visual range of a human eye in a horizontal direction.
Figure 4:
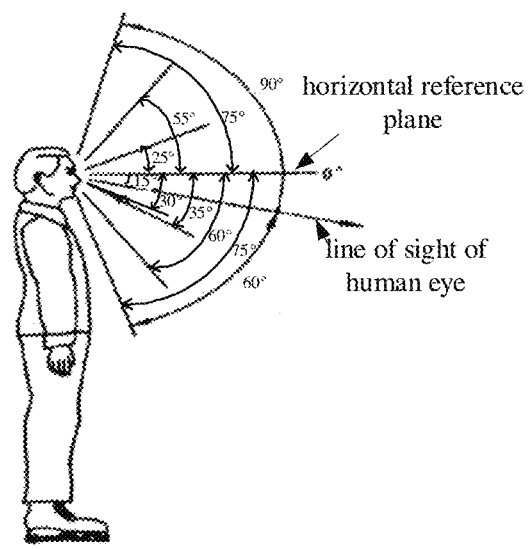
FIG. 4 is a schematic diagram of a visual range of a human eye in a vertical direction.

FIG. 3 is a schematic diagram illustrating a visual range of a human eye in a horizontal direction, and FIG. 4 is a schematic diagram illustrating a visual range of a human eye in a vertical direction. According to the above definitions, the plane shown in FIG. 3 is the horizontal reference plane, and the plane shown in FIG. 4 is the vertical reference plane. As shown in FIGS. 3 and 4, when the human body is in a natural state, the line of sight of the human eye is parallel to the vertical reference plane, and meanwhile, the line of sight of the human eye is 15° from the horizontal reference plane and the line of sight extends downward (see FIG. 4). In this case, the maximum visual angle of the human eye in the horizontal direction is 190°, i.e., 95° to the left of the line of sight of the human eye and 95° to the right of the line of sight of the human eye, as shown in FIG. 3; the maximum visual angle of the human eye in the vertical direction is 150°, i.e., 60° to the lower side of the line of sight of the human eye and 90° to the upper side of the line of sight of the human eye, as shown in FIG. 4.

In order to adapt to the maximum visual angles of the human eye in the horizontal and vertical directions, in the embodiment of the present disclosure, by taking the vertical reference plane as a dividing line, the visual angle of the display panel 1 on one side of the vertical reference plane (e.g., the upper side of the vertical reference plane in FIG. 3) is 95°, and the visual angle of the display panel 1 on the other side of the vertical reference plane (e.g., the lower side of the vertical reference plane in FIG. 3) is 95°; by taking the horizontal reference plane as a dividing line, the visual angle of the display panel 1 on one side of the horizontal reference plane (e.g., the upper side of the horizontal reference plane in FIG. 4) is 75°, and the visual angle of the display panel 1 on the other side of the horizontal reference plane (e.g., the lower side of the horizontal reference plane in FIG. 4) is 75°.

Optionally, a ratio of a length M of an upper (lower) edge to a length N of a left (right) edge of the display panel 1 in the plan view of the display panel is 8:3, i.e., a length-width ratio of a display image on one side of the vertical reference plane is 4:3, and a length-width ratio of the display image on the other side of the vertical reference plane is 4:3. The display image with a length-width ratio of 4:3 has the least distortion.

The display panel may include the following four display regions.

1) Middle Display Region 101

An area, on the display panel 1, swept by rotating the horizontal reference plane clockwise by a first angle with the horizontal rotation axis as a rotation axis is a first area.

An area, on the display panel 1, swept by rotating the vertical reference plane clockwise by a second angle with the vertical rotation axis as a rotation axis and rotating the vertical reference plane anticlockwise by the second angle with the vertical rotation axis as a rotation axis is a second area.

The middle display region 101 is an overlap area between the first area and the second area.

Optionally, the first angle is 30°, and the second angle is 15°.

2) First Peripheral Display Sub-Region 1021

An area, on the display panel 1, swept by rotating the horizontal reference plane clockwise by a third angle with the horizontal rotation axis as a rotation axis and rotating the horizontal reference plane anticlockwise by a fourth angle with the horizontal rotation axis as a rotation axis is a third area, and the third angle is greater than the first angle.

An area, on the display panel 1, swept by rotating the vertical reference plane clockwise by a fifth angle with the vertical rotation axis as a rotation axis and rotating the vertical reference plane anticlockwise by the fifth angle with the vertical rotation axis as a rotation axis is a fourth area, and the fifth angle is greater than the second angle.

The first peripheral display sub-region 1021 is an area outside the middle display region 101 and in an overlap area between the third area and the fourth area.

Optionally, the third angle is 35°, the fourth angle is 25°, and the fifth angle is 35°.

3) Second Peripheral Display Sub-Region 1022

An area, on the display panel 1, swept by rotating the horizontal reference plane clockwise by a sixth angle with the horizontal rotation axis as a rotation axis and rotating the horizontal reference plane anticlockwise by a seventh angle with the horizontal rotation axis as a rotation axis is a fifth area, the sixth angle is greater than the third angle, and the seventh angle is greater than the fourth angle.

An area, on the display panel 1, swept by rotating the vertical reference plane clockwise by an eighth angle with the vertical rotation axis as a rotation axis and rotating the vertical reference plane anticlockwise by the eighth angle with the vertical rotation axis as a rotation axis is a sixth area, and the eighth angle is greater than the fifth angle.

The second peripheral display sub-region 1022 is an area outside the middle display region 101 and the first peripheral display sub-region 1021 and in an overlap area between the fifth area and the sixth area.

Optionally, the sixth angle is 60°, the seventh angle is 55°, and the eighth angle is 90°.

4) Third Peripheral Display Sub-Region 1023

An area, on the display panel 1, swept by rotating the horizontal reference plane clockwise by a ninth angle with the horizontal rotation axis as a rotation axis and rotating the horizontal reference plane anticlockwise by a tenth angle with the horizontal rotation axis as a rotation axis is a seventh area, the ninth angle is greater than the sixth angle, and the tenth angle is greater than the seventh angle.

An area, on the display panel 1, swept by rotating the vertical reference plane clockwise by an eleventh angle with the vertical rotation axis as a rotation axis and rotating the vertical reference plane anticlockwise by the eleventh angle with the vertical rotation axis as a rotation axis is an eighth area, and the eleventh angle is greater than the eighth angle.

The third peripheral display sub-region 1023 is an area outside the middle display region 101, the first peripheral display sub-region 1021 and the second peripheral display sub-region 1022 and in an overlap area between the seventh area and the eighth area.

Optionally, the ninth angle is 75°, the tenth angle is 75°, and the eleventh angle is 95°.

In the embodiment, to facilitate fabrication of the display panel 1, the actual resolution of each peripheral display sub-region is equal to the actual resolution of the middle display region 101. Further, to ensure that display quality of the display panel 1 reaches the level of retina display when the user views the display panel 1 at a preset viewing distance (typically 5 cm), the actual resolutions of respective peripheral display sub-regions and the middle display region 101 may be greater than 2000 ppi. Furthermore, considering that a too large actual resolution may result in increased costs and increased process difficulty, the actual resolutions of respective peripheral display sub-regions and the middle display region 101 may be between 2000 ppi and 2100 ppi in the embodiments of the present disclosure.

As an alternative in the embodiment, it is assumed that the display resolution of the middle display region 101 is a, and the value of a is between 2000 ppi and 2100 ppi.

Optionally, the display resolution of the first peripheral display sub-region 1021 may range from $a*\cos^2(35°)$ to a (including $a*\cos^2(35°)$, but excluding a).

Optionally, the display resolution of the second peripheral display sub-region 1022 may range from 0 to $a*\cos^2(35°)$ (excluding 0, but including $a*\cos^2(35°)$).

Optionally, the display resolution of the third peripheral display sub-region 1023 is less than the display resolution of the second peripheral display sub-region 1022 and approaches zero.

In an embodiment, the peripheral display sub-regions and the middle display region 101 each have an actual resolution of 2100 ppi, and the middle display region 101 has a display resolution of 2000 ppi.

From the above, when the display panel 1 provided in the embodiments of the present disclosure displays an image, there is a pixel that is not operated to display at least in the peripheral display sub-regions, and the pixel that is not operated to display may serve as an alternative pixel for the user to operate. In addition, because part of the pixels in the display panel are not operated to display, an overall power consumption of the display panel can be lowered effectively.

It should be noted that when the display panel is implemented as having different display resolutions in different display regions, the display panel optionally has an equal actual resolution in different display regions, which is not limited in the present disclosure. It can be understood by a person skilled in the art that the actual resolutions of the display regions on the display panel in the embodiments of the present disclosure may not be completely equal, and it is only required to ensure that the actual resolution of each display region is greater than or equal to the display resolution thereof. In at least one embodiment of the present disclosure, the actual resolution of the middle display region of the display panel is greater than the actual resolution of the peripheral display region of the display panel.

In order to meet the requirement of high actual resolution for display, a micro-LED is selected as a light emitting element constituting a pixel on the display panel 1 in the embodiment. The size of the micro-LED is currently at least 1 um, which can be adapted to the high actual resolution requirement for display. In at least one embodiment of the present disclosure, the middle display region and the peripheral display regions of the display panel have micro-LEDs with different pixel densities, respectively.

It should be noted that the case that the peripheral display sub-regions are ring-shaped is exemplary only, the peripheral display sub-regions in the embodiments of the present disclosure may be in other shape such as square. Besides, the ring shape may be continuous or may include several separate parts. Further, the term "surround" in the embodiments of the present disclosure is not limited to a case that the peripheral display region (or, the peripheral display sub-region) surrounds the middle display region from four directions of upper, lower, left, and right to form a closed pattern, but may include a case that the peripheral display region (or, the peripheral display sub-region) is located on at least one side of the middle display region.

Figure 5:
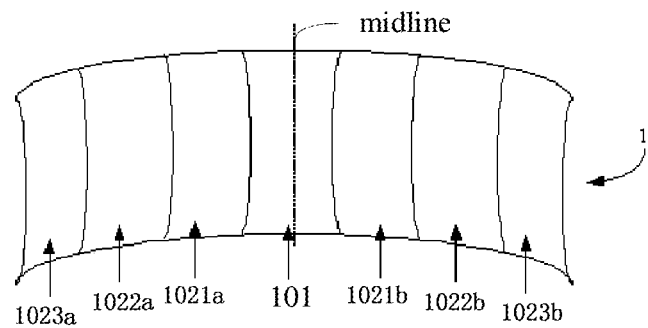
FIG. 5 is a schematic diagram of another structure of a display panel provided in an embodiment of the present disclosure.
Figure 6:
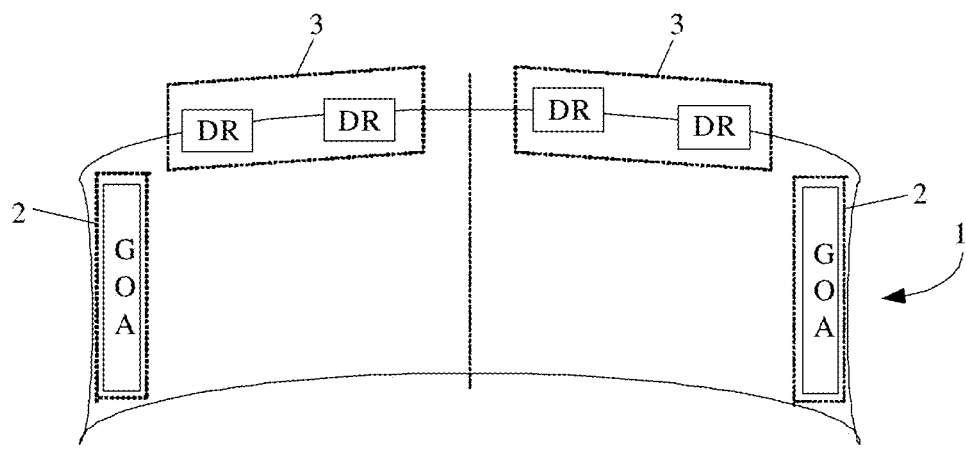
FIGS. 6 to 9 are schematic diagrams of four different structures of a driving circuit in a display panel in an embodiment of the present disclosure.

FIG. 5 is a schematic diagram of another structure of a display panel provided in an embodiment of the present disclosure. As shown in FIG. 5, each of the peripheral display sub-regions 1021*a*/1021*b*/1022*a*/1022*b*/1023*a*/1023*b* is bar-shaped, the number of the peripheral display sub-regions is six, and the six peripheral display sub-regions are arranged on two sides of the middle display region symmetrically. The peripheral display sub-regions 1021*a*/1022*a*/1023*a* surround the left side of the middle display region 101, and the peripheral display sub-regions 1021*b*/1022*b*/1023*b* surround the right side of the middle display region 101. The peripheral display sub-regions 1021*a*/1022*a*/1023*a* and the peripheral display sub-regions 1021*b*/1022*b*/1023*b* are symmetrical about the midline of the display panel.

Optionally, the display resolutions of the peripheral display sub-regions 1021*a*/1021*b* are greater than the display resolutions of the peripheral display sub-regions 1022*a*/1022*b*, and the display resolutions of the peripheral display sub-regions 1022*a*/1022*b* are greater than the display resolutions of the peripheral display sub-regions 1023*a*/1023*b*. In the case shown in FIG. 5, the display resolutions of the middle display region 101 and the peripheral display sub-regions 1021*a*/1021*b*/1022*a*/1022*b*/1023*a*/1023*b* may be set according to previous experiments.

Needless to say, other regional division may be adopted in the embodiments of the present disclosure, and is not listed herein.

FIGS. 6 to 9 are schematic diagrams of four different structures of a driving circuit in a display panel in an embodiment of the present disclosure. As shown in FIGS. 6 to 9, independent driving circuits are provided on both left and right sides of the display panel in the embodiments of the present disclosure and configured to drive the display panel to display a left image and a right image, respectively. The driving unit includes a gate driver 2 configured to output scan signals to gate lines (not shown) of the display panel and a source driver 3 configured to output data signals to data lines (not shown) of the display panel.

Figure 7:
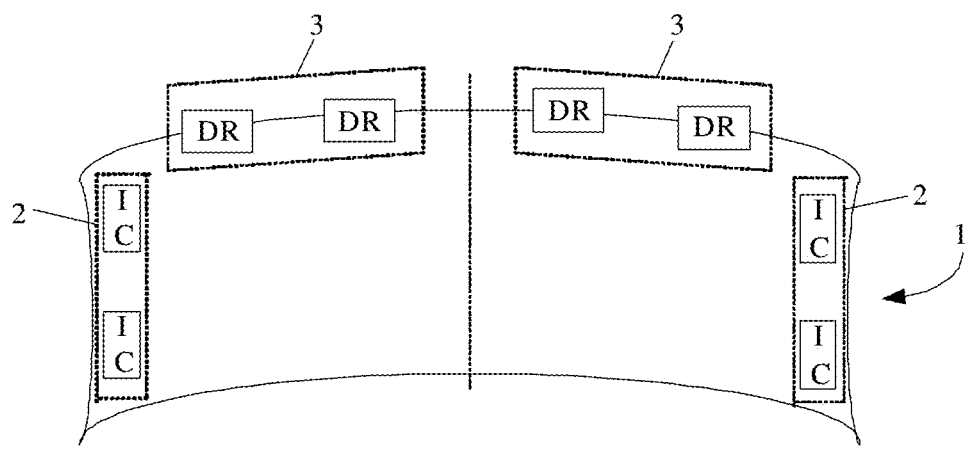
Figure 8:
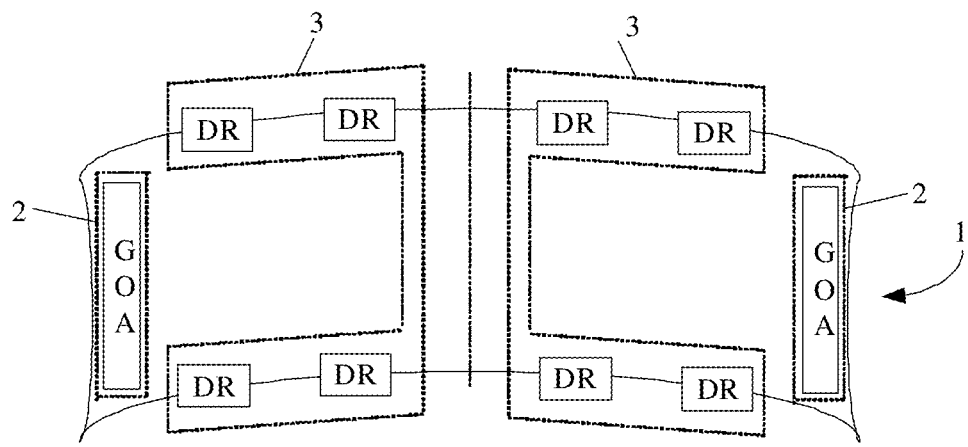
Figure 9:
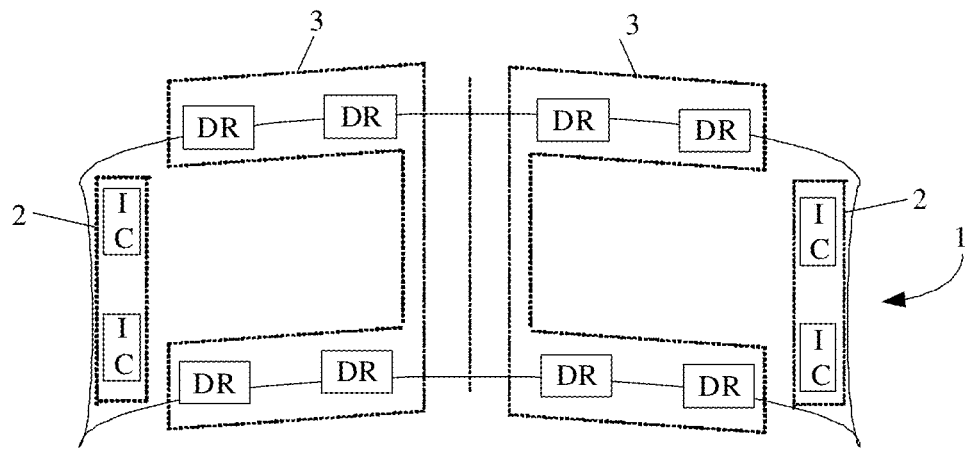

Optionally, the gate driver may be implemented by a GOA (Gate Driver On Array) drive circuit (referring to FIGS. 6 and 8), or by several gate driver chips IC (referring to FIGS. 7 and 9).

In at least one embodiment, the gate driver may include two independent drive parts configured to drive left and right parts of the display panel to display, respectively.

Optionally, the source driver includes several source drive sub-circuits DR, all of which are located on one side (referring to FIGS. 6 and 7) or two opposite sides (referring to FIGS. 8 and 9) of the display panel. In the case that all of the source drive sub-circuits DR are located on one side of the display panel, one end of the data line is connected to a corresponding source drive sub-circuit, and the data lines are driven unidirectionally; in the case that all of the source drive sub-circuits DR are located on two opposite sides of the display panel, both ends of the data line are respectively connected to corresponding source drive sub-circuits DR, and the data lines are driven bidirectionally. Bidirectional driving can improve drive efficiency effectively.

It should be noted that the specific process that the gate driver 2 and the source driver 3 cooperate to display an image will not be described in detail herein.

Figure 10:
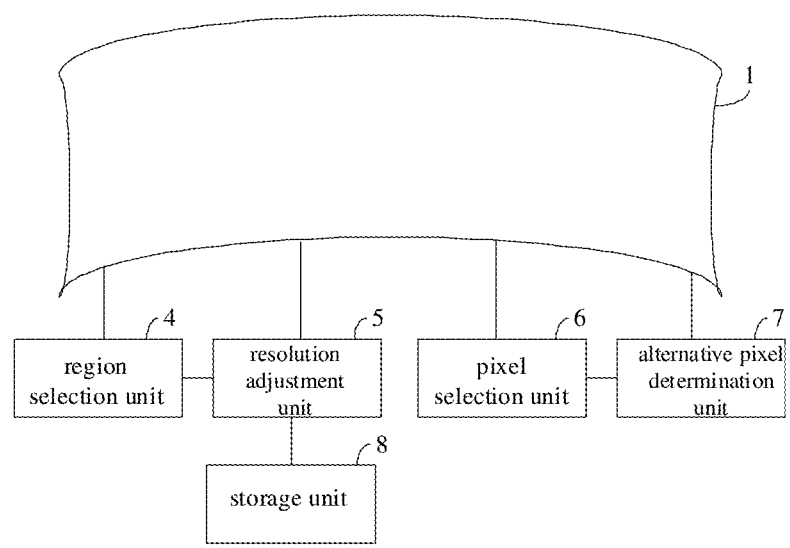
FIG. 10 is a schematic diagram of a structure of a display apparatus provided in an embodiment of the present disclosure.

FIG. 10 is a schematic diagram of a structure of a display apparatus provided in an embodiment of the present disclosure. As shown in FIG. 10, the display apparatus includes a display panel 1 and a driver. The display panel 1 includes a middle display region and a peripheral display region surrounding the middle display region. The driver drives the display panel 1 such that a display resolution of the middle display region is greater than a display resolution of the peripheral display region. The display panel 1 may be the display panel provided in the above embodiments. For detailed description thereof, the above embodiments may be referred to, and no repeated description will be given herein.

Optionally, the display apparatus further includes an input device configured to receive a user input, and a first processor (such as a chip). The first processor functions as: a region selection unit 4 configured to determine a to-be-adjusted region on the display panel 1 according to the user input; and a resolution adjustment unit 5 configured to adjust a display resolution of the to-be-adjusted region. Optionally, the resolution adjustment unit 5 adjusts the display resolution of the to-be-adjusted region according to the user input.

Figure 11:
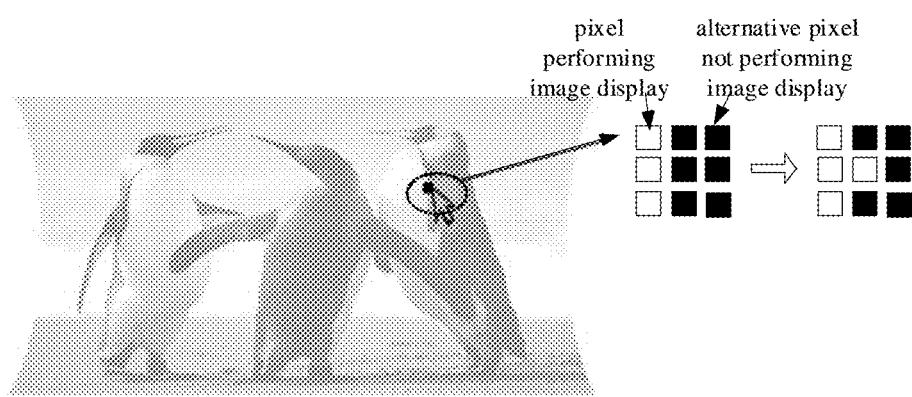
FIG. 11 is a schematic diagram of using a display apparatus in an embodiment of the present disclosure to adjust display resolution.

FIG. 11 is a schematic diagram of using a display apparatus in an embodiment of the present disclosure to adjust display resolution. As shown in FIG. 11, when the user needs to improve the display resolution of a certain region of the display panel, the user can select a to-be-adjusted region through the input device such as a mouse or the like, the region selection unit 4 recognizes the to-be-adjusted region selected by the user, and the resolution adjustment unit 5 performs a sharpening process on the to-be-adjusted region, and drives more pixels in the to-be-adjusted region to perform image display. It should be noted that the sharpening processing algorithm used in the embodiment of the present disclosure may be any existing image processing algorithm converting low resolution to high resolution. Needless to say, the display resolution of the to-be-adjusted region can be decreased according to the user's needs in the embodiment of the present disclosure, and the specific process thereof will not be described in detail herein.

It should be noted that when viewing a display image, the user may select an unclear part of the display image through the input device and adjust the display resolution of the part until the display quality of each position on the display panel 1 meets the user's needs.

Optionally, the display apparatus further includes a storage unit (memory) 8 configured to store position information of the to-be-adjusted region and display resolution information of the to-be-adjusted region having been adjusted in association with each other. With the storage unit storing the history setting of the user, the history setting can be easily called by the user for next use.

Optionally, the display apparatus further includes a second processor (such as a chip), which functions as a pixel selection unit 6 and an alternative pixel determination unit 7. The pixel selection unit 6 is configured to select an abnormal pixel on the display panel 1; and the alternative pixel determination unit 7 is configured to determine an alternative pixel that is around the abnormal pixel and does not perform image display, and drive the alternative pixel that does not perform image display to perform image display.

Figure 12:
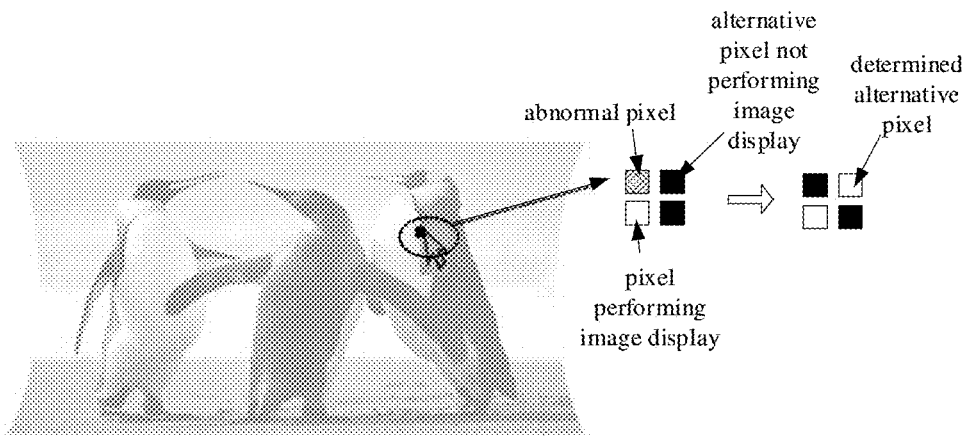
FIG. 12 is a schematic diagram of using a display apparatus in an embodiment of the present disclosure to compensate for an abnormal pixel.

FIG. 12 is a schematic diagram of using a display apparatus in an embodiment of the present disclosure to compensate for an abnormal pixel. As shown in FIG. 12, when the user finds that a certain pixel is abnormal in display, the user may select the abnormal pixel through the input device (such as a mouse). The pixel selection unit 6 recognizes the abnormal pixel selected by the user, and the alternative pixel determination unit 7 searches for and determines an alternative pixel that is closest to the abnormal pixel, drives the determined alternative pixel to perform image display and turns off the abnormal pixel at the same time.

Embodiments of the present disclosure further provide a virtual reality (VR) device including a display apparatus, and the display apparatus is the display apparatus provided in the above embodiments. For the detailed description of the display apparatus, contents in the above embodiments may be referred to, and repeated description will not be given here.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

The invention claimed is:

1. A driving method of a display panel, the display panel comprising a middle display region and a peripheral display region surrounding the middle display region;
   wherein the driving method comprises: driving the display panel such that a display resolution of the middle display region is greater than a display resolution of the peripheral display region,
   the peripheral display region comprises a first peripheral display sub-region and a second peripheral display sub-region arranged from a side close to the middle display region to a side away from the middle display region,
   a ratio between the display resolution of the first peripheral display sub-region and the display resolution of the middle display region ranges from $Cos^2(35°)$ to 1; and
   a ratio between the display resolution of the second peripheral display sub-region and the display resolution of the middle display region ranges from 0 to $Cos^2(35°)$.

2. The driving method of claim 1, wherein the display resolution of the peripheral display region decreases as moving away from the middle display region.

3. The driving method of claim 2, wherein
   the peripheral display region comprises a plurality of peripheral display sub-regions, and of any two adjacent peripheral display sub-regions of the plurality of peripheral display sub-regions, one peripheral display sub-region away from the middle display region surrounds the other peripheral display sub-region close to the middle display region, and
   the display resolution of any peripheral display sub-region is greater than the display resolution of other peripheral display sub-region on a side of the peripheral display sub-region away from the middle display region.

4. The driving method of claim 3, wherein each of the plurality of peripheral display sub-regions is ring-shaped.

5. The driving method of claim 1, wherein the peripheral display region comprises a plurality of peripheral display sub-regions on two sides of the middle display region, each of the plurality of peripheral display sub-regions is bar-shaped, and the display resolutions of the plurality of peripheral display sub-regions decrease in a direction away from the middle display region.

6. The driving method of claim 4, wherein
   the display panel corresponds to a viewing reference point, which is a point located on a normal line passing through a center point of the display panel and having a distance equal to a preset viewing distance from the center point;
   a horizontal plane passing through the viewing reference point and passing through midpoints of left and right edges of the display panel in a plan view of the display panel is a horizontal reference plane, a vertical plane passing through the viewing reference point and passing through midpoints of upper and lower edges of the display panel in the plan view of the display panel is a vertical reference plane; a horizontal straight line is on the horizontal reference plane, passes through the viewing reference point and is perpendicular to a normal line passing through a center point of the display panel, a vertical straight line is on the vertical reference plane, passes through the viewing reference point and is perpendicular to the normal line passing through the center point of the display panel;
   the display panel comprises a first area swept by rotating the horizontal reference plane clockwise by a first angle with the horizontal rotation axis as a rotation axis; and a second area by rotating the vertical reference plane clockwise by a second angle with the vertical rotation axis as a rotation axis and rotating the vertical reference plane anticlockwise by the second angle with the vertical rotation axis as a rotation axis; the middle display region is an overlapped area between the first area and the second area;
   the display panel comprises a third area swept by rotating the horizontal reference plane clockwise by a third angle with the horizontal rotation axis as a rotation axis and rotating the horizontal reference plane anticlockwise by a fourth angle with the horizontal rotation axis as a rotation axis, wherein the third angle is greater than the first angle; and a fourth area swept by rotating the vertical reference plane clockwise by a fifth angle with the vertical rotation axis as a rotation axis and rotating the vertical reference plane anticlockwise by the fifth angle with the vertical rotation axis as a rotation axis; the fifth angle is greater than the second angle; the first peripheral display sub-region is an area outside the middle display region and in an overlapped area between the third area and the fourth area; and
   the display panel comprises a fifth area swept by rotating the horizontal reference plane clockwise by a sixth angle with the horizontal rotation axis as a rotation axis and rotating the horizontal reference plane anticlockwise by a seventh angle with the horizontal rotation axis as a rotation axis, wherein the sixth angle is greater than the third angle, and the seventh angle is greater than the fourth angle; and a sixth area swept by rotating the vertical reference plane clockwise by an eighth angle with the vertical rotation axis as a rotation axis and rotating the vertical reference plane anticlockwise by the eighth angle with the vertical rotation axis as a rotation axis; the eighth angle is greater than the fifth angle; the second peripheral display sub-region is an area outside the middle display region and the first peripheral display sub-region and in an overlapped area between the fifth area and the sixth area.

7. The driving method of claim 6, wherein the peripheral display region further comprises a third peripheral display sub-region on a side of the second peripheral display sub-region away from the middle display region, the display panel comprises a seventh area swept by rotating the horizontal reference plane clockwise by a ninth angle with the horizontal rotation axis as a rotation axis and rotating the horizontal reference plane anticlockwise by a tenth angle with the horizontal rotation axis as a rotation axis, wherein the ninth angle is greater than the sixth angle, and the tenth angle is greater than the seventh angle; and an eighth area swept by rotating the vertical reference plane clockwise by an eleventh angle with the vertical rotation axis as a rotation axis and rotating the vertical reference plane anticlockwise by the eleventh angle with the vertical rotation axis as a rotation axis; the eleventh angle is greater than the eighth angle; and the third peripheral display sub-region is an area outside the middle display region, the first peripheral display sub-region and the second peripheral display sub-region and in an overlapped area between the seventh area and the eighth area.

8. The driving method of claim 7, wherein
the first angle is 30°; the second angle is 15°;
the third angle is 35°; the fourth angle is 25°; the fifth angle is 35°;
the sixth angle is 60°; the seventh angle is 55°; the eighth angle is 90°; and
the ninth angle is 75°; the tenth angle is 75°; the eleventh angle is 95°.

9. The driving method of claim 1, wherein a light emitting element constituting a pixel on the display panel comprises a micro-LED.

10. The driving method of claim 9, wherein the middle display region and the peripheral display region of the display panel have micro-LEDs with different pixel densities.

11. The driving method of claim 1, wherein an actual resolution of the peripheral display region is equal to an actual resolution of the middle display region.

12. The driving method of claim 1, wherein actual resolutions of the peripheral display region and the middle display region are in the range of 2000 ppi to 2100 ppi.

13. The driving method of claim 1, wherein a length ratio of a long edge and a short edge of the display panel in a plan view is 8:3.

14. The driving method of claim 1, wherein the middle display region of the display panel has an actual resolution greater than or equal to the display resolution of the middle display region, and the peripheral display region of the display panel has an actual resolution greater than or equal to the display resolution of the peripheral display region.

15. A display apparatus, comprising a display panel and a driver, the display panel comprising a middle display region and a peripheral display region surrounding the middle display region;

wherein the driver drives the display panel such that a display resolution of the middle display region is greater than a display resolution of the peripheral display region, the peripheral display region comprises a first peripheral display sub-region and a second peripheral display sub-region arranged from a side close to the middle display region to a side away from the middle display region, a ratio between the display resolution of the first peripheral display sub-region and the display resolution of the middle display region ranges from $Cos^2(35°)$ to 1; and a ratio between the display resolution of the second peripheral display sub-region and the display resolution of the middle display region ranges from 0 to $Cos^2(35°)$.

16. The display apparatus of claim 15, further comprising:
an input device configured to receive a user input; and
a first processor functioning as:
a region selection unit configured to determine a to-be-adjusted region on the display panel according to the user input; and
a resolution adjustment unit configured to adjust a display resolution of the to-be-adjusted region.

17. The display apparatus of claim 16, further comprising:
a memory configured to store position information of the to-be-adjusted region and display resolution information of the to-be-adjusted region that has been adjusted.

18. The display apparatus of claim 15, further comprising a second processor functioning as:
a pixel selection unit configured to select an abnormal pixel on the display panel; and
an alternative pixel determination unit configured to determine an alternative pixel that is around the abnormal pixel and does not perform image display, and drive the determined alternative pixel to perform image display.

19. A virtual reality device, comprising a display apparatus of claim 15.

* * * * *